US009897772B2

(12) United States Patent
Hong et al.

(10) Patent No.: US 9,897,772 B2
(45) Date of Patent: Feb. 20, 2018

(54) FIXING MODULE FOR FIXING AN OPTICAL SYSTEM TO AN OPTICAL APPARATUS AND AN OPTICAL APPARATUS INCLUDING THE SAME

(71) Applicants: SAMSUNG ELECTRONICS CO., LTD., Suwon-si, Gyeonggi-do (KR); SAMSUNG DISPLAY CO., LTD., Yongin, Gyeonggi-Do (KR)

(72) Inventors: Sang-Joon Hong, Seoul (KR); Hi-Kuk Lee, Yongin-si (KR); Sang-Don Jang, Suwon-si (KR)

(73) Assignees: SAMSUNG ELECTRONICS CO., LTD., Suwon-si, Gyeonggi-do (KR); SAMSUNG DISPLAY CO., LTD., Yongin, Gyeonggi-do (KR)

( * ) Notice: Subject to any disclaimer, the term of this patent is extended or adjusted under 35 U.S.C. 154(b) by 650 days.

(21) Appl. No.: 14/563,463

(22) Filed: Dec. 8, 2014

(65) Prior Publication Data
US 2015/0260211 A1  Sep. 17, 2015

(30) Foreign Application Priority Data

Mar. 14, 2014  (KR) .................. 10-2014-0030439

(51) Int. Cl.
*G02B 7/02*   (2006.01)
*F16B 11/00*  (2006.01)

(52) U.S. Cl.
CPC ............ *G02B 7/025* (2013.01); *F16B 11/008* (2013.01); *Y10T 403/472* (2015.01)

(58) Field of Classification Search
CPC ...................................... G02B 7/025
See application file for complete search history.

(56) References Cited

U.S. PATENT DOCUMENTS

| 4,469,399 A | 9/1984 | Cowen et al. | |
| 4,778,253 A * | 10/1988 | Siga ....................... | G02B 7/025 156/89.15 |
| 5,249,082 A * | 9/1993 | Newman ................ | G02B 7/028 359/813 |

(Continued)

FOREIGN PATENT DOCUMENTS

| JP | 2004-079737 A | 3/2004 |
| JP | 2009-181144 A | 8/2009 |

(Continued)

*Primary Examiner* — Daniel J Wiley
(74) *Attorney, Agent, or Firm* — Lee & Morse, P.C.

(57) ABSTRACT

Disclosed is a fixing module for fixing an optical system to an optical apparatus, including a coupling unit having a plate to couple to the apparatus, the coupling unit having a first penetrating space at a central portion thereof and a protruding portion protruded downwards from the plate; a first fixing unit combinable with the coupling unit and having a receiving space including a thermosetting resin such that the protruding portion is fixed into the thermosetting resin; and a second fixing unit combinable with the first fixing unit and having a second penetrating space communicating with the first penetrating space, such that the optical system can penetrate through the first and the second penetrating spaces and be fixed by the second fixing unit.

18 Claims, 9 Drawing Sheets

(56) References Cited

U.S. PATENT DOCUMENTS

| | | | | |
|---|---|---|---|---|
| 5,424,874 | A * | 6/1995 | Ishikawa | F21S 48/1208 359/819 |
| 5,526,193 | A * | 6/1996 | Anzai | G02B 7/025 359/811 |
| 6,233,103 | B1 * | 5/2001 | Ikeda | B29C 65/54 359/808 |
| 6,854,918 | B2 * | 2/2005 | Ueno | B29C 66/54 403/265 |
| 6,859,337 | B2 * | 2/2005 | Oshino | G02B 7/00 359/813 |
| 6,954,311 | B2 * | 10/2005 | Amanai | G02B 7/022 353/100 |
| 7,292,310 | B2 | 11/2007 | Dekker et al. | |
| 8,456,614 | B2 | 6/2013 | Tomita | |
| 8,587,882 | B2 * | 11/2013 | Wippermann | G02B 7/025 359/455 |
| 8,654,461 | B2 | 2/2014 | Park et al. | |
| 2002/0135767 | A1 | 9/2002 | Richard et al. | |
| 2003/0162484 | A1 * | 8/2003 | Oshino | G02B 7/00 451/42 |
| 2004/0130807 | A1 * | 7/2004 | Hattori | G02B 7/022 359/811 |
| 2004/0179112 | A1 * | 9/2004 | Chen | G02B 7/025 348/222.1 |
| 2005/0030647 | A1 * | 2/2005 | Amanai | G02B 13/009 359/798 |
| 2007/0159703 | A1 * | 7/2007 | Apel | G02B 7/021 359/819 |
| 2007/0206170 | A1 | 9/2007 | Epihara | |
| 2008/0100934 | A1 * | 5/2008 | Webster | G02B 7/021 359/830 |
| 2009/0251800 | A1 * | 10/2009 | Iwai | G02B 7/025 359/704 |
| 2010/0199491 | A1 * | 8/2010 | Watanabe | B29D 11/00009 29/832 |
| 2013/0249584 | A1 | 9/2013 | Lou et al. | |

FOREIGN PATENT DOCUMENTS

| | | |
|---|---|---|
| JP | 2010-107735 A | 5/2010 |
| JP | 2013-74089 A | 4/2013 |
| KR | 10-2008-0088580 A | 10/2008 |
| KR | 10-2012-0068547 A | 6/2012 |

* cited by examiner

FIXING MODULE FOR FIXING AN OPTICAL SYSTEM TO AN OPTICAL APPARATUS AND AN OPTICAL APPARATUS INCLUDING THE SAME

CROSS-REFERENCE TO RELATED APPLICATION

Korean Patent Application No. 10-2014-0030439 filed on Mar. 14, 2014, in the Korean Intellectual Property Office, and entitled: "Fixing Module for Fixing an Optical System to an Optical Apparatus and an Optical Apparatus Including the Same," is incorporated by reference herein in its entirety.

BACKGROUND

1. Field

Example embodiments relate to a fixing module for fixing an optical system and an optical apparatus having the same, for example, to a two-point type fixing module and an optical apparatus for manufacturing semiconductor devices to which an optical system may be fixed by using the two-point type fixing unit.

2. Description of the Related Art

An optical system may be fixed to semiconductor optical apparatus for manufacturing semiconductor devices, such as exposure apparatus and inspection apparatus, through two steps including an aligning mode and a fixing mode in view of the sensitivity and rigidity of the optical system. The optical system may be fixed to the semiconductor optical apparatus, a focusing distance for the optical apparatus may be searched repeatedly in the aligning mode, and the aligned optical system may be accurately fixed to the optical apparatus at the very position of the optical system in the fixing mode.

SUMMARY

Embodiments may be realized by providing a fixing module for fixing an optical system to an apparatus, including a coupling unit having a plate to couple to the apparatus, the coupling unit having a first penetrating space at a central portion thereof and a protruding portion protruded downwards from the plate; a first fixing unit combinable with the coupling unit and having a receiving space including a thermosetting resin such that the protruding portion is fixed into the thermosetting resin; and a second fixing unit combinable with the first fixing unit and having a second penetrating space communicating with the first penetrating space, such that the optical system can penetrate through the first and the second penetrating spaces and be fixed by the second fixing unit.

The thermosetting resin may include a room temperature thermosetting resin which hardens at room temperature and a plurality of hardening agents for controlling a hardening velocity of the room temperature thermosetting resin such that a hardening time of the room temperature thermosetting resin is greater than an aligning time during which the optical system is aligned together with and the first and the second fixing units, so that the protruding portion moves in the thermosetting resin in the aligning time.

The thermosetting resin may include one or more of a phenol resin, a urea resin, a melamine resin, an epoxy resin, a polyimide resin, or a polyester resin.

The first fixing unit may include a body in a shape of the plate and having a trench at an upper portion thereof, so that the receiving space is provided in the trench at the upper portion of the body and the protruding portion is inserted into the thermosetting resin in the receiving space of the body.

A top surface of the thermosetting resin may be lower than an upper surface of the first fixing unit and the protruding portion may be spaced apart from a bottom of the trench.

The second fixing unit may include a first clamp combinable with the first fixing unit and having a first penetration opening at a central portion thereof such that at least a slot is provided through the first clamp and at least a flexible portion having a reduced thickness is provided under the slot; a second clamp under the first clamp and having a second penetration opening communicating with the first penetration opening to thereby provide a second penetrating space, the second clamp to make contact with the optical system penetrating through the first and the second penetrating spaces; and at least one interposer between the first and the second clamps, the at least one interposer transferring a relative deformation of the fixing module to the flexible portion of the first clamp, to protect the optical system from stress caused by the relative deformation.

The first and the second clamps may each be separated into first and second pieces, and the second fixing unit may further include a constant fastener combining the first and the second pieces with each other by a constant pressure; and a variable fastener combining the first and the second pieces with each other by a variable pressure, so that a compressive force of the second clamp to the optical system is variable.

The first fixing unit may be separated into first and second pieces, the first piece of the first clamp may be integrally provided with the first piece of the first fixing unit in one body, the second piece of the first clamp may be integrally provided with the second piece of the first fixing unit in one body, the coupling unit may be separated into first and second pieces, the first piece of the coupling unit may correspond to the first piece of the first fixing unit, and the second piece of the coupling unit may correspond to the second piece of the first fixing unit.

The at least one interposer may include a slender member extending in a radial direction of a width of the first clamp under a central portion of the slot.

Three interposers may be uniformly arranged along a peripheral area of the first clamp at a central angle of 120° with respect to the central axis of the second penetrating space.

The fixing module may further include a fixing guide to secure to the apparatus and combinable with the coupling unit, so that the coupling unit can be secured to the apparatus via the fixing guide.

The apparatus may fix to the optical system at a first point and the second fixing unit may fix to the optical system at a second point.

Embodiments may be realized by providing an optical apparatus, including a support on a base; a chamber on the base and defining an inner space in which the support is covered, the chamber having a chamber opening through which the inner space communicates with surroundings; an optical system over the support and penetrating through the chamber; an aligning driver driving the optical system; and a fixing module fixing the optical system at first and second points. The fixing module may include a coupling unit having a plate coupled to the chamber at the chamber opening and having a first penetrating space at a central portion thereof and a protruding portion protruded downwards from the plate, a first fixing unit combinable with the coupling unit and having a receiving space including a thermosetting resin such that the protruding portion is fixed into the thermosetting resin, and a second fixing unit combinable with the first fixing unit and having a second penetrating space communicating with the first penetrating space, the optical system penetrating through the first and the second penetrating spaces and being fixed by the second fixing unit.

The aligning driver may be arranged on an outer side of the chamber around the chamber opening and the fixing module may be arranged in the inner space of the chamber such that the optical system penetrates through the aligning driver, the chamber opening, and the fixing module, and is fixed to the chamber by the first and the second units and the coupling unit.

The optical apparatus may further include a detecting module under the support and detecting the optical characteristics of the optical system; and a controller connected to the detecting module.

Embodiments may be realized by providing an optical apparatus, including an optical system; and a fixing module including thermosetting resin, the optical system being fixed to the optical apparatus at a first point and fixed to the fixing module at a second point.

The optical system may be fixed to the fixing module at the second point by compressive force.

The fixing module may include a coupling unit having a plate coupled to the chamber at the chamber opening and having a first penetrating space at a central portion thereof and a protruding portion protruded downwards from the plate, a first fixing unit combinable with the coupling unit and having a receiving space including the thermosetting resin such that the protruding portion is fixed into the thermosetting resin, and a second fixing unit combinable with the first fixing unit and having a second penetrating space communicating with the first penetrating space, the optical system penetrating through the first and the second penetrating spaces; and the optical system may be fixed to the second fixing unit at the second point.

The thermosetting resin may include a resin selected from the group consisting of a phenol resin, a urea resin, a melamine resin, an epoxy resin, a polyimide resin, and a polyester resin.

The thermosetting resin may harden at room temperature and may include a plurality of hardening agents.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
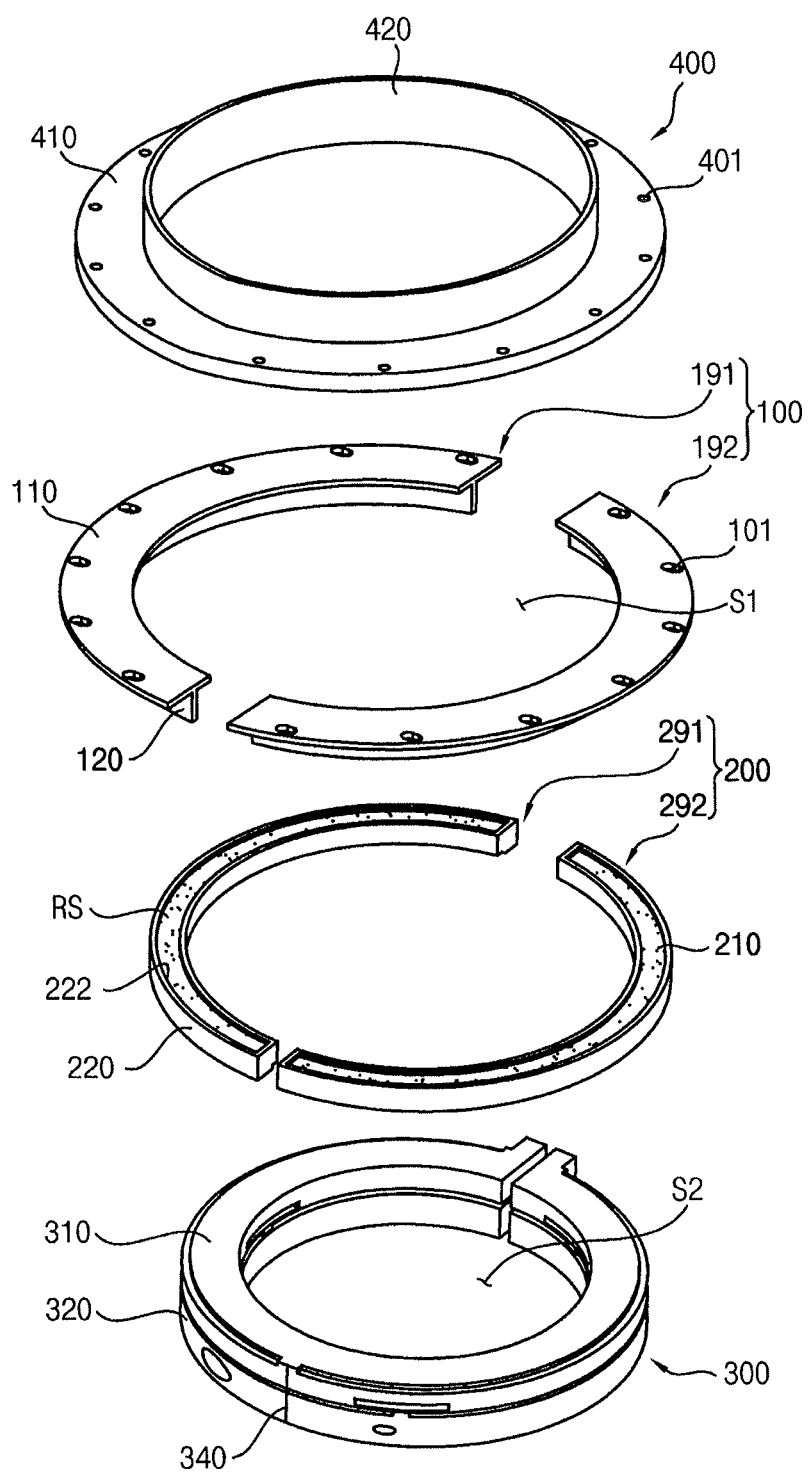
FIG. 1 illustrates an exploded perspective view of a fixing module for fixing an optical system to an optical apparatus in accordance with an embodiment.

Example embodiments will now be described more fully hereinafter with reference to the accompanying drawings; However, they may be embodied in different forms and should not be construed as limited to the embodiments set forth herein. Rather, these embodiments are provided so that this disclosure will be thorough and complete, and will fully convey exemplary implementations to those skilled in the art.

In the drawings, the sizes and relative sizes of layers and regions may be exaggerated for clarity. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an Orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Fixing Module for Fixing an Optical System

Figure 2A:
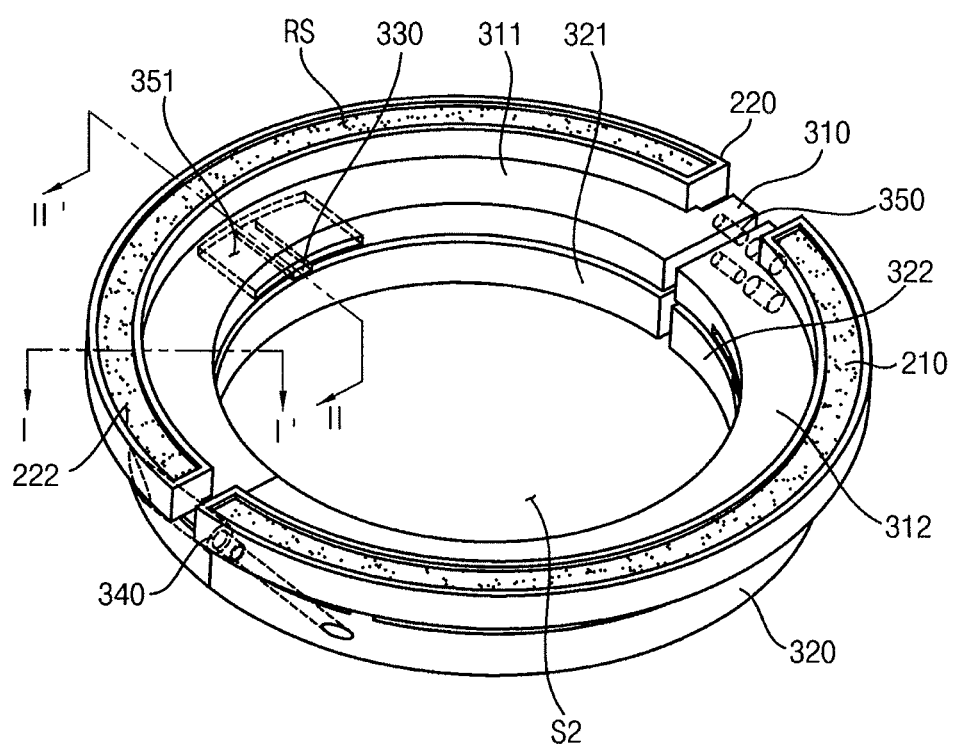
FIG. 2A illustrates a perspective view of an assembly of first and second fixing units of the fixing module shown in FIG. 1.
Figure 2B:
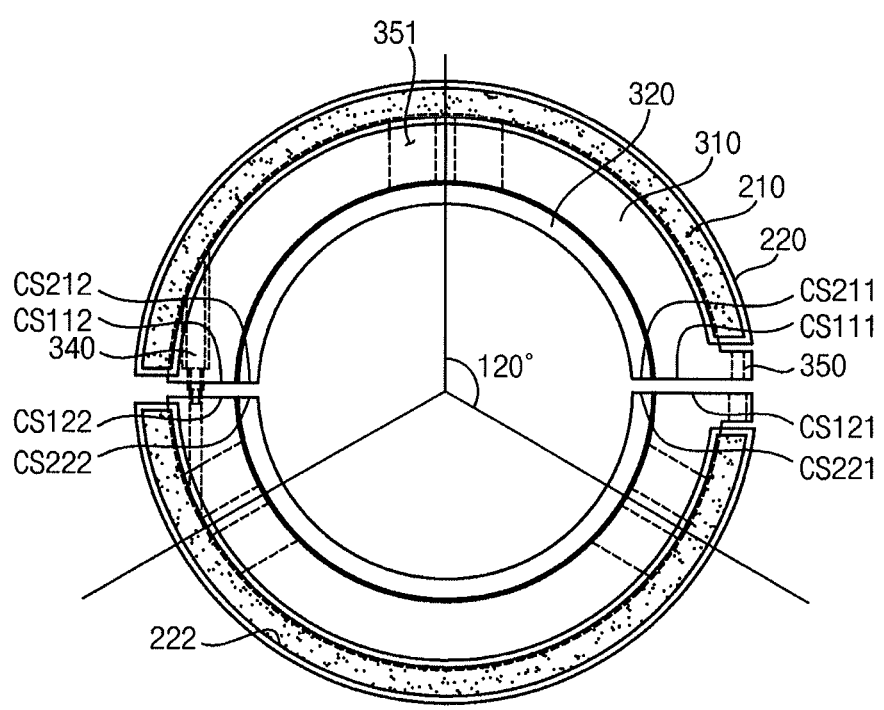
FIG. 2B illustrates a plan view of the assembly of first and second fixing units shown in FIG. 2A.
Figure 3A:
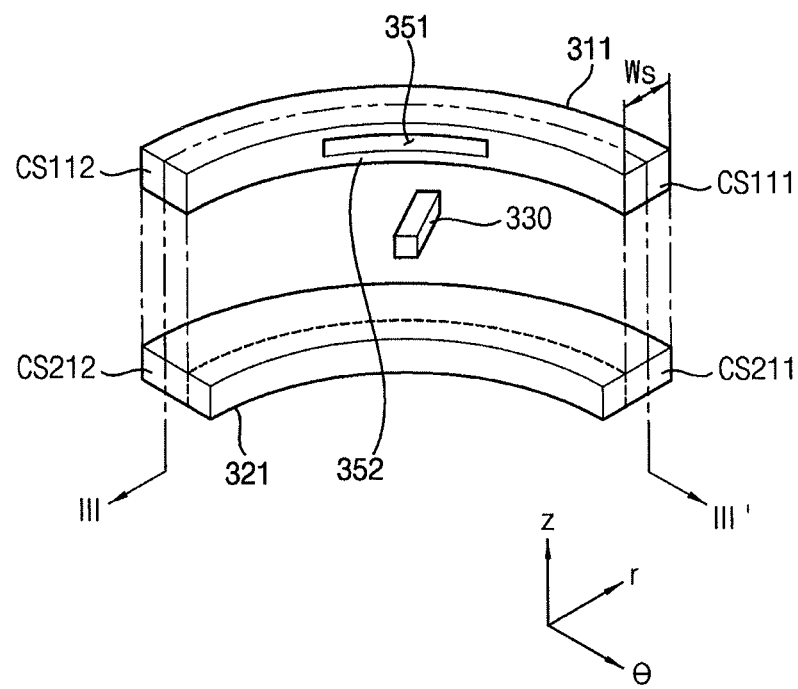
FIG. 3A illustrates an enlarged exploded perspective partial view of a second fixing unit of the fixing module shown in FIG. 1.
Figure 3B:
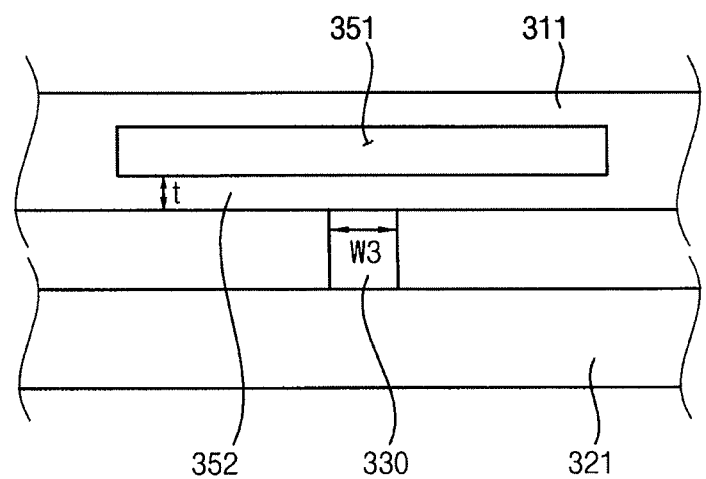
FIG. 3B illustrates a cross-sectional view cut along a line III-III' in FIG. 3A.
Figure 4A:
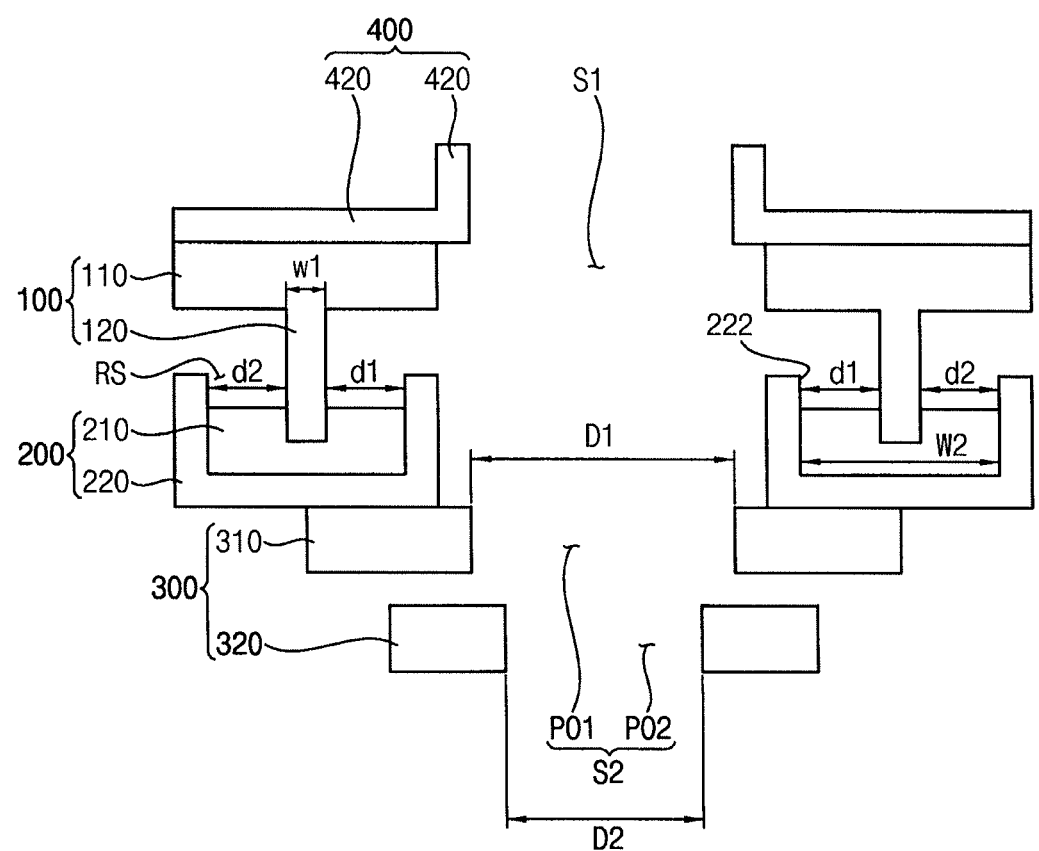
FIG. 4A illustrates a cross-sectional view of the fixing module cut along a line I-I' in FIG. 1.
Figure 4B:
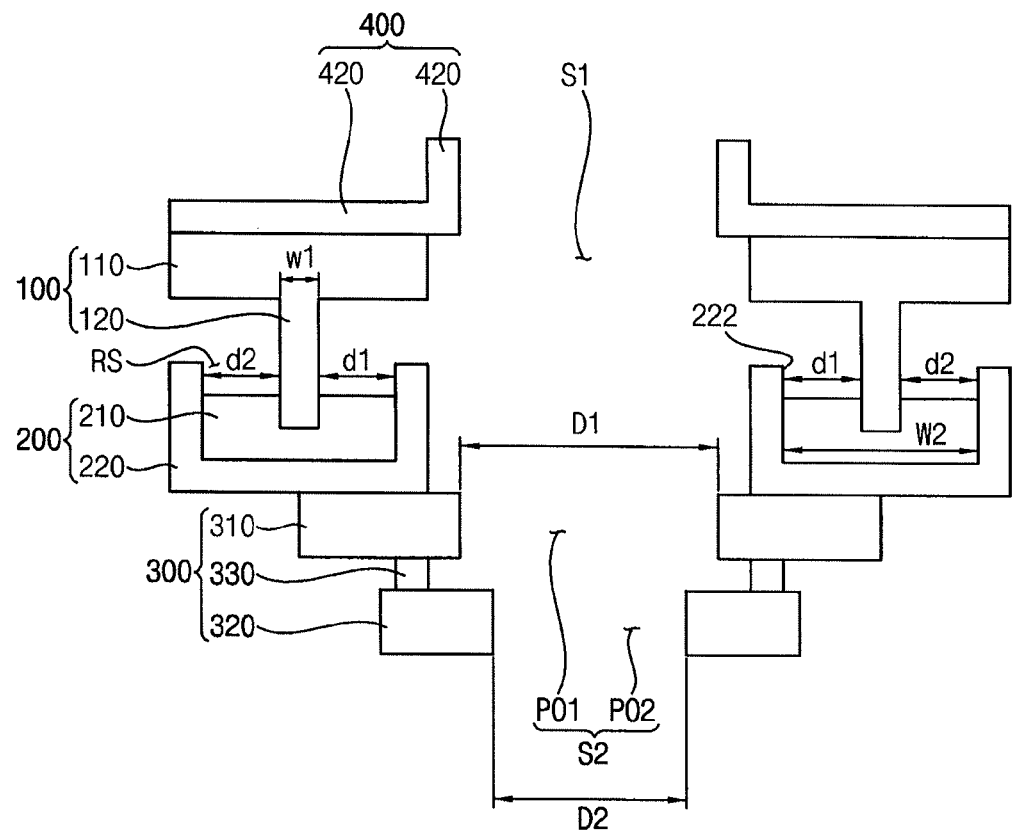
FIG. 4B illustrates a cross-sectional view of the fixing module cut along a line II-II' in FIG. 1.

FIG. 1 illustrates an exploded perspective view of a fixing module for fixing an optical system to an optical apparatus in accordance with an embodiment. FIG. 2A illustrates a perspective view of an assembly of first and second fixing units of the fixing module shown in FIG. 1. FIG. 2B illustrates a plan view of the assembly of first and second fixing units shown in FIG. 2A. FIG. 3A illustrates an enlarged exploded perspective partial view of a second fixing unit of the fixing module shown in FIG. 1. FIG. 3B illustrates a cross-sectional view cut along a line III-III' in FIG. 3A. FIG. 4A illustrates a cross-sectional view of the fixing module cut along a line I-I' in FIG. 1 and FIG. 4B illustrates a cross-sectional view of the fixing module cut along a line II-II' in FIG. 1.

Referring to FIGS. 1 to 4B, the fixing module 500 in accordance with an embodiment may include a coupling unit 100 configured to have a plate 110 coupled to an optical apparatus (not shown) and having a first penetrating space S1 at a central portion thereof and a protruding portion 120 protruded downwards from the plate 110, a first fixing unit 200 configured to be combinable with the coupling unit 100 under the plate 110 and having a receiving space RS in which a thermosetting resin 210 is received such that the protruding portion 120 is fixed into the thermosetting resin 210, and a second fixing unit 300 configured to be combinable with the first fixing member 200 and to have a second penetrating space S2 communicating with the first penetrating space S1. The optical system may penetrate through the first and the second penetrating spaces S1 and S2 and be fixed by the second fixing unit. The fixing module 500 may further include a fixing guide 400 for guiding the fixing location of the optical apparatus to which the coupling unit 100 may be secured.

For example, the coupling unit 100 may be directly secured to the optical apparatus or may be indirectly secured to the optical apparatus by using the fixing guide 400, and the fixing module 500 may be directly secured to a chamber of the optical apparatus through the coupling unit 100.

For example, the coupling unit 100 may include the plate 110 that may be coupled to the optical apparatus (not shown) and have the first penetrating space S1 at a central portion thereof. The protruding portion 120 may protrude from the plate 100 downwards.

The plate 110 may have various shapes according to the shapes of the installation site of the optical apparatus to which the optical system may be fixed. For example, the installation site of the optical apparatus may include a plurality of protrusions and recesses, and the plate 110 may also include a plurality of recesses and protrusions corresponding to the protrusions and recesses of the installation site. In an embodiment, the coupling unit 100 may be secured to the installation site by fasteners such as bolts, and a surface of the coupling unit 100 may be treated to be flat.

In an embodiment, the optical system may be in a shape of a cylinder penetrating through the optical apparatus at the installation site, and the plate 110 of the coupling unit 100 may be in a shape of a ring having the first penetrating space S1 at a central portion thereof. The cylindrical optical system may penetrate through the first penetrating space S1 of the ring-shaped plate 110. A plurality of bolt holes 101 may be uniformly provided on a peripheral portion of the ring-shaped plate 110 along a circumferential line thereof.

The cylindrical optical system may have a cross-sectional circular surface, and the first penetrating space S1 may also have a cross-sectional circular surface. In an embodiment, the cross-sectional shape of the first penetrating space S1 may be varied according to the cross-sectional shape of the optical system. In an embodiment, the optical system may penetrate through the first penetrating space S1 without contacting with the plate 110, and the shape of the first penetrating space S1 may be irrelevant to the cross-sectional shape of the optical system.

The protruding portion 120 may protrude downwards from the plate 110 and may be integrally formed with the plate 110 in one body. The protruding potion 120 may be fixed into the thermosetting resin 210 of the first fixing unit 200, and the second fixing unit 300 combinable with the first fixing unit may also be secured to the optical apparatus by way of the first fixing unit 200 and the protruding portion 120.

The protruding portion 120 may be partially dipped into a liquefied thermosetting resin 210, and the liquefied thermosetting resin 210 may be stirred by the protruding portion 120 while the optical system may be controlled to align with the optical apparatus and to determine the optimal position in the aligning mode. In an embodiment, the optimal position may be searched and determined, and the aligning mode may be stopped and the optical system may keep in staying at the optimal position while the protruding portion 120 may still be dipped into the liquefied resin 210. Then, the liquefied resin 210 may be hardened for a preset hardening time, the protruding portion 120 may also be fixed in the thermosetting resin 210 in the receiving space RS of the first fixing unit 200, and the coupling unit and the first fixing unit 200 may be firmly fixed to each other by the protruding portion 120.

In an embodiment, the aligning mode for searching the optimal position may be performed on the optical system after the first and second fixing units 200 and 300 are combined with the optical system, and the optical system may not deviate from the optimal position, for example, due to the fastening forces for combining the first and the second fixing units 200 and 300 to the optical system. The aligning mode may be performed on the assembly of the optical system and the first and the second fixing units 200 and 300, and the coupling unit 100 may not restrict the motion of the assembly of optical system and the first and the second fixing units 200 and 300 in the aligning mode and may be firmly fixed into the thermosetting resin of the first fixing unit 200 after completing the aligning mode. The thermosetting resin may sufficiently sustain the assembly of the optical system and the first and the second fixing units 200 and 300.

The protruding portion 120 may have various shapes as long as the protruding portion 120 may be extended into the receiving space RS and be partially dipped into the thermosetting resin in the receiving space RS. In an embodiment, the protruding portion 120 may have a sufficient strength against the resin resistance in the receiving space RS in view of the dipping length.

The protruding portion 120 may have a relatively large cross-sectional surface, and both of an inner gap distance d1 and an outer gap distance d2 may also be reduced in the receiving space RS between the protruding portion 120 and the first fixing unit 200.

The inner and outer gap distances d1 and d2 may determine a maximal variation of the assembly of the optical system and the first and second fixing units 200 and 300 in the aligning mode. The reduction of the inner and outer gap distances d1 and d2 may cause the reduction of the operational range of the assembly of the optical system and the first and the second fixing units 200 and 300, and the aligning errors in the installation process of the optical system may be increased. The size of the protruding portion 120 may be determined in view of the sufficient inner and outer gap distances d1 and d2 as well as the sufficient strength.

In an embodiment, the protruding portion 120 may be integrally formed together with the plate 110. In an embodiment, the plate 110 and the protruding portion 120 may be individually formed independent from each other and may be combined into the coupling unit 100 thereafter.

In an embodiment, the first fixing unit 200 may include a body 220 having a trench 222 at an upper portion thereof and the receiving space RS may be provided in the trench 222. A width w1 of the protruding portion 120 may be about ⅓ to about ¼ times of a width w2 of the trench 222 of the body 220. In an embodiment, a tip of the protruding portion 120 may be spaced apart from a bottom of the trench 222. If the tip of the protruding portion 120 makes contact with the bottom of the trench 222, a thermal expansion of the protruding portion 120 may cause thermal stresses to the first and the second fixing units 200 and 300. The optical system may be influenced by thermal expansion of the protruding portion 120, which may cause deterioration of the optical characteristics of the optical system. Thus, the protruding portion 120 may be spaced apart from the bottom of the trench 222 greater than an allowable maximal thermal expansion. In an embodiment, the protruding portion 120 may have a length such that the protruding portion 120 may be sufficiently dipped into the thermosetting resin 210 while the protruding portion 120 is spaced apart from the bottom of the trench 222 by an allowable maximal gap distance.

The first fixing unit 200 may be arranged under the plate 110, e.g., a ring-shaped plate, and may include the receiving space RS at an upper portion thereof and the thermosetting resin may be provided in the receiving spacers. The upper portion of the first fixing unit 200 may be combinable with the coupling unit 100 and a lower portion of the first fixing unit 200 may be combinable with the second fixing unit 300. The coupling unit 100 and the first fixing unit may be combinable with each other, and the protruding portion 120 may be fixed into the thermosetting resin 210. The optical system may be fixed to the optical apparatus at the optimal position that may be determined in the aligning mode.

For example, the first fixing unit 200 may include the body 220 having the trench 222 and the thermosetting resin 210 received in the receiving space RS. In an embodiment, the plate 110 may be in a shape of a ring of which the central potion may be open and provided as the first penetrating space S1, and the body 220 may also be in a shape of a ring corresponding to the ring-shaped plate 110.

The thermosetting resin may include a room temperature thermosetting resin, which may be hardened at room temperature, and a plurality of hardening agents for controlling a hardening velocity of the room temperature thermosetting resin, and a hardening time of the thermosetting resin may be greater than an aligning time of the optical system in the aligning mode. When fluid, the thermosetting resin may have high fluidity and small viscosity, and the protruding portion 120 may move in the thermosetting resin 210 when the assembly of the optical system and the first and the second fixing units 200 and 300 are in the aligning mode. The protruding portion 120 may move in the liquefied resin 210 until the aligning mode is completed.

The room temperature thermosetting resin may be sufficiently hardened without any heating at room temperature and the material properties, e.g., heat resistance, mechanical characteristics and chemical resistance, of the room temperature thermosetting resin may be modified by various fillers. Hardening agents may be filled into a resin and may control the hardening velocity of the resin. The material and amount of the hardening agents may be varied according to the thermosetting resin and the required hardening time. For example, hexamethylenetetramine may be used as the hardening agents for a phenol resin and amine-based materials and polyamide materials may be used as the hardening agents for an epoxy resin.

In an embodiment, the optical system may be fixed to the optical apparatus at room temperature, and the room temperature thermosetting resin may be used as the thermosetting resin 210. The optical system may need to be fixed to the optical apparatus at a high temperature, and a high temperature resin, which may be hardened at a high temperature, may be used as the thermosetting resin 210. In an embodiment, the high temperature resin may be controlled to function as the room temperature thermosetting resin by using hardening accelerators. In an embodiment, the thermosetting resin may include a phenol resin, a urea resin, a melamine resin, an epoxy resin, a polyimide resin and a polyester resin.

The body 220 may be arranged under the plate 110 and have a width corresponding to a width of the plate 110. The trench 222 may be provided at the upper portion of the body 220 having a depth greater than a length of the protruding portion 120, and the trench space may be provided as the receiving space RS at the upper portion of the body 220. The coupling 100 and the first fixing unit 200 may be combinable with each other, and the protruding portion 120 may be arranged in the receiving space RS. As described above, the width of the trench 222 may be determined in view of the operational range of the aligning mode and the width of the protruding portion 120 and the trench 222 may have a depth greater than the protruding length of the protruding portion 120 in order that the protruding portion 120 may not contact with the bottom of the trench 222.

The first fixing unit 200 may be combinable with the second fixing unit 300 that may be arranged under the first fixing unit 200. In the aligning mode, the optical system may be secured to the second fixing unit 300 and the second fixing unit 300 may move together with the optical system in the aligning mode. The second fixing unit 300 may be combinable with the first fixing unit 200, and the first fixing unit 200 may also move together with the optical system. Hereinafter, the combination of the first and the second fixing units 200 and 300 may be referred to as fixing joint. The assembly of the optical system and the fixing joint may be adjusted or slightly moved by an aligning driver together with each other in the aligning mode.

When starting the fixing of the optical system to the optical apparatus, the assembly of the optical system and the fixing joint may be arranged in the optical apparatus in such a configuration that the protruding portion 120 may be partially dipped into the thermosetting resin 210 of the first fixing unit 200, and then the aligning mode may be performed and the optimal position may be determined. The thermosetting resin may be kept in a liquid state while the assembly of the optical system and the fixing joint may be adjusted or slightly moved by an aligning driver. The hardening agent may control the hardening process of the thermosetting resin, and the thermosetting resin may be hardened after the aligning time of the aligning mode.

The thermosetting resin 210 may be kept in a liquid state or a sol structure in the aligning mode, and the protruding portion 120 may not be impeded by the thermosetting resin 210 in the aligning mode. The assembly of the optical system and the fixing joint may be sufficiently moved and adjusted, and the optimal position may be searched. Although the protruding portion 120 may be partially dipped into the thermosetting resin 210 of the first fixing unit 200, the movement of the assembly of the optical system and the fixing joint may not be retarded or impeded by the thermosetting resin 210. The thermosetting resin 210 may have sufficiently small viscosity and high fluidity in the aligning mode, the assembly of the optical system and the fixing joint may be moved or adjusted in a 3-dimensional space without any limitations to the degree of kinematic freedom, and the optimal position of the optical system in the optical apparatus may be determined.

The aligning time for aligning the optical system at the installation site may be varied according to the structure and configurations of the optical apparatus, and the hardening agent may also be varied according to the optical apparatus. The material and amount of the hardening agent may be determined, and the hardening time of the resin 210 may be greater than the aligning time of the optical apparatus.

For example, a top surface of the thermosetting resin 210 may be lower than an upper surface of the body 220 and the volume variation in the hardening process may be limited in the receiving space RS, and the vertical variation of the protruding portion 120 may also be limited in the receiving space RS.

The optimal position may be determined in the aligning mode, the aligning of the assembly of the optical system and the fixing joint may be stopped, and the optical system may be kept at the optimal position. The optical system and the first and the second fixing units 200 and 300 may be kept at the optimal position.

Then, the thermosetting resin may be hardened with the hardening time elapse, and the protruding portion 120 may be fixed into the thermosetting resin 210. The coupling unit 100 including the protruding portion 120 may be secured to the chamber of the optical apparatus, and the assembly of the optical system and the fixing joint may also be secured to the optical apparatus.

The optical system may be secured to the optical apparatus not by external fastening forces but by the hardening of the thermosetting resin 210, and the assembly of the optical system and the fixing joint may be kept at the optimal position. The optical system may be sufficiently prevented from deviating from the optimal position in the fixing mode, in which the optical system may be fixed at a second point as well as at a first point corresponding to the optimal position by the second fixing unit 300, and misalignment of the optical system may be sufficiently prevented in the fixing mode.

The second fixing unit 300 may be combinable with the first fixing unit 200 and may have a second penetrating space S2 communicating with the first penetrating space S1. The optical system may penetrate through the first and the second penetrating spaces S1 and S2 and may be fixed by the second fixing unit 300, and deterioration of the optical characteristics of the optical system, for example, due to the vibrations of the optical apparatus, may be prevented.

For example, the second fixing unit 300 may include a first clamp 310 combinable with the body 220 of the first fixing unit 200 and having a first penetration opening PO1, a second clamp 320 arranged under the first clamp 310 and having a second penetration opening PO2 communicating with the first penetration opening PO1 and an interposer 330 interposed between the first and the second clamps 310 and 320 and transferring a relative deformation of the first and the second clamps 310 and 320 to the first clamp 310. The relative deformation of the first and the second clamps 310 and 320 may have no effect on the optical system due to the interposer 330.

The first and the second clamps 310 and 320 may face each other and the interposer 330 may be interposed between the first and the second clamps 310 and 320 and the first fixing unit 200 may be combinable with an upper portion of the first clamp 310.

The first and the second penetration openings PO1 and PO2 may communicate with each other, and a second penetrating space PS2 through which the optical system may penetrate may be formed. The optical system may be enclosed with the first fixing unit 200 through the first and the second penetration openings PO1 and PO2.

The first clamp 310 may be combinable with the first fixing unit 200 and the second clamp 320 may be combinable with the first clamp 310.

In an embodiment, the first and the second clamps 310 and 320 may be separated into first pieces 311 and 321 and second pieces 312 and 322, respectively. The first piece 311 of the first clamp 310 may include first and second cutting surfaces CS111 and CS112 and the second piece 312 of the first clamp 310 may include third and fourth cutting surfaces CS121 and CS122 corresponding to the first and second cutting surfaces CS111 and CS112, respectively. In an embodiment, the first piece 321 of the second clamp 320 may include fifth and sixth cutting surfaces CS211 and CS212 and the second piece 322 of the second clamp 320 may include seventh and eighth cutting surfaces CS221 and CS222 corresponding to the fifth and sixth cutting surfaces CS211 and CS212, respectively. The fifth and sixth cutting surfaces CS211 and CS212 may be arranged under the first and second cutting surfaces CS111 and CS112, respectively, and the seventh and eighth cutting surfaces CS221 and CS222 may be arranged under the third and fourth cutting surfaces CS121 and CS122, respectively.

Various fasteners may be provided with the cutting surfaces of the first and second clamps 310 and 320, and the first and the second pieces 311 and 312 of the first clamp 310 may be detachably combinable with each other by the fasteners, and the first and the second pieces 321 and 322 of the second clamp 320 may be detachably combinable with each other by the fasteners. In an embodiment, the first and the second clamps 310 and 320 may also be detachably combinable with each other by the same fastener, and the second fixing unit 300 may be formed.

In an embodiment, constant fasteners 340 may be provided across the second and fourth cutting surfaces CS112 and CS122 and across the sixth and eighth cutting surfaces CS212 and CS222, respectively, and the first and the second pieces 311, 321, 312, and 322 may be combinable with each other by constant fastening forces. In an embodiment, variable fasteners 350 may be provided across the first and third cutting surfaces CS111 and CS121 and across the fifth and seventh cutting surfaces CS211 and CS221, respectively, and the first and the second pieces 311, 321, 312, and 322 may be combinable with each other by variable fastening forces. The variable fasteners 350 may control compressive forces to the optical system.

For example, the constant fastener 340 may include a first bolt (not shown) for fastening across the second and the fourth cutting surfaces CS112 and CS122 and a second bolt (not shown) for fastening across the sixth and the eights cutting surfaces CS212 and CS222. Various fastening members may be utilized in place of the bolts for fastening the first and the second pieces as long as the first and the second pieces may be detachably combined to each other.

The variable fastener 350 may include a first pressure controller (not shown) for fastening across the first and the third cutting surfaces CS111 and CS121 with a variable compressive force and a second pressure controller (not shown) for fastening across the fifth and the seventh cutting surfaces CS211 and CS221 with a variable compressive force, and the fixing forces of the first and the second clamps 310 and 320 to the optical system may be controlled by the first and second pressure controllers. For example, the first and the second pressure controller may include a pair of bolt and nut, and the fixing forces of the first and the second clamps 310 and 320 may be varied according as the bolt may go forward and backward through the nut.

For example, the first and the second clamps 310 and 320 may be in a shape of a circular disk and the first and the second penetration openings PO1 and PO2 may have circular cross-sectional area having different diameters. The first penetration opening PO1 may be larger than the second penetration opening PO2, the second fixing unit may be combinable with the optical system, and the optical system may make contact just with the second penetration opening PO2 and make no contact with the first penetration opening PO1. The fixing force of the second clamp 320 to the optical system may be controlled by the second pressure controller and the first pressure controller may not work for fixing the optical system.

For example, the first and the second clamps 310 and 320 may be separated into the first and the second pieces 311, 321, 312 and 322, and the first fixing unit 200 may also be separated into a first split fixer 291 corresponding to the first piece 311 of the first clamp 310 and a second split fixer 292 corresponding to the second piece 312 of the first clamp 310. In an embodiment, the coupling unit 100 may also be separated into a first coupling piece 191 corresponding to the first split fixer 291 and a second coupling piece 192 corresponding to the second split fixer 292. In an embodiment, the coupling unit 100 and the first fixing unit 200 may be provided as a single body although the second fixing unit 300 may be separated into the first and the second pieces 311, 321, 312 and 322 as long as the fixing module 500 may be easily assembled and separated into components.

For example, the first piece 311 of the first clamp 310 may be combined with the first piece 321 of the second clamp 320, and the first piece joint (not shown) may be formed, and the second piece 312 of the first clamp 310 may be combined with the second piece 322 of the second clamp 320, and the first piece joint (not shown) may be formed. Then, the first and the second piece joints may be combined with each other by using the constant fastener 340 and the variable fastener 350, the optical system may be enclosed by the first and the second piece joints, and the second fixing unit 300 may be formed. The fixing force of the second fixing unit to the optical system may be controlled by the variable fastener 350.

For example, the first split fixer 291 may be integrally formed with the first piece 311 of the first clamp 310 in one body and the second split fixer 292 may be integrally formed with the second piece 312 of the first clamp 310 in one body, and the first fixing unit 200 may be fixed to the optical system simultaneously with the second fixing unit 300.

In an embodiment, the first clamp 310 and the second clamp 320 may be provided in a single body. For example, the first pieces 311 and 321 of the first and the second clamps 310 and 320 may be provided as a single piece to which the interposer 330 may be interposed between the first pieces 311 and 321, and a first single body piece (not shown) may be formed. The second pieces 312 and 322 of the first and the second clamps 310 and 320 may be provided as a single piece to which the interposer 330 may be interposed between the second pieces 312 and 322, and a second single body piece (not shown) may be formed. Then, the first and the second single body pieces may be combined with each other by the constant and the variable fasteners 340 and 350, and the second fixing unit 300 may be formed.

The interposer 330 may be interposed between the first and the second clamps 310 and 320 and may transfer relative deformations between the components of the fixing module 500 to a flexible portion 352 of the first clamp 310, and the stresses caused by the relative deformation of the fixing module 500 may be prevented from transferring to the optical system. The optical system may be protected from thermal stresses in operating the optical apparatus, and the damage to the optical characteristics of the optical system and deterioration of the optical accuracy of the optical apparatus may be prevented.

For example, the clamp 310 may be in a shape of a ring and may include a slot 351 penetrating through the clamp 310 in a radial direction of the ring-shaped clamp 310, and the first clamp 310 may have relatively smaller thickness under the slot 351 as compared with an overall thickness, and the relatively thin portion under the slot 351 may have relatively greater flexibility as compared with the relatively thick portion. The clamp 310 may include a flexible portion 352 having a relatively greater flexibility than any other portions thereof under the slot 351.

In an embodiment, a plurality of the slots 351 may be arranged along a circumferential line of the first clamp 310, and an elastic coefficient of the first clamp 310 may be increased at every flexible portion 352. The mechanical stresses caused by the relative deformation of the fixing module 500 may be applied to the flexible portion 352 of the first clamp 310, and the flexible portion 352 may be elastically deformed within the increased flexibility. The relative deformation of the fixing module 500 may be absorbed in the flexible portion 352 of the first clamp 310 and may not be transferred to the optical system, and the first clamp 310 may function as a flexible hinge due to the flexible portion 352.

The interposer 330 may include a slender member in the radial direction r and may make contact with a lower surface of the first clamp 310 and an upper surface of the second clamp 320. For example, the interposer 330 may extend along the radial direction r under a central portion of the slot 351. In an embodiment, the interposer 330 may include a slender member extending in a direction, e.g., a radial direction, of a width Ws of the first clamp 310.

In an embodiment, the flexible portion 352 may have a thickness t of about 0.6 mm to about 1.0 mm and the interposer 330 may have a width w3 of about 5.5 mm to about 6.5 mm. For example, the first clamp 310, the second clamp 320 and the interposer 330 may comprise the same materials, and deformation characteristics of the interposer 330 may be similar to those of the first and the second clamps 310 and 320 under the same mechanical stresses.

The first and the second clamps 310 and 320 and the interposer 330 may be integrally formed in one body and may comprise the same material, and deformation of the second clamp 320 may be transferred to the flexible portion 352 of the first clamp 310 through the interposer 330 due to the relatively higher elasticity. Deformation of the second clamp 320 may hardly be transferred to the optical system that may be contact with the second clamp 320. Although the relative deformation may occur at the second clamp 320, the relative deformation may be absorbed into the flexible portion 352 and the optical system may be protected from the relative deformation of the second clamp 320, and deterioration of the optical characteristics of the optical system may be prevented.

The chamber of the optical apparatus may include granite and the first and the second fixing units 200 and 300 may include alumina, and a relatively large thermal stresses may be applied to the second fixing unit 300 due to the difference of the thermal expansions between the granite and the alumina. In an embodiment, the thermal stresses may be absorbed by the flexible portion 352 of the first clamp 310 and may not be transferred to the optical system, and the optical system may be prevented from being distorted by the thermal stresses.

An elastic coefficient of the flexible portion 352 may be varied according to the size and shape of the slot 351 and the thickness and shape of the interposer 330, and the elastic range of the flexible portion 352 and the interposer 330 may be controlled to sufficiently absorb the allowable maximal thermal stresses of the optical apparatus.

The interposer 330 may be integrally provided with the first and the second clamps 310 and 320 in one body. For example, a single cylinder may be partially removed from the first and the second clamps 310 and 320 along a radial line on the same cross-sectional area, and at least one groove may be formed on a side surface of the cylinder. The remaining portion of the cylinder around the groove may form the interposer 330. An upper portion of the cylinder above the groove may be formed by the first clamp 310 and a lower portion of the cylinder below the groove may be formed by the second clamp 320. Thereafter, a portion of the first clamp 310 on the interposer 330 along a circumferential line on the same cross-sectional area may be removed, and the slot 351 on the interposer 330 may be formed.

Thermal stresses may be applied to the second fixing unit 300, and strain of the second fixing unit 300 along the radial direction r may be sufficiently prohibited due to the geometry of the ring-shaped second fixing unit 300. In an embodiment, strain of the second fixing unit 300 along a central axis direction z of the second penetrating space S2 may be absorbed by the interposer 330 and the flexible portion 352 of the first clamp 310. The tilting strain of the second fixing unit 300 with respect to an r-θ plane may also be absorbed by the interposer 330 and the flexible portion 352. The second fixing unit 300 may function as a flexible hinge structure in the optical apparatus.

In an embodiment, three interposes may be arranged at a central angle of about 120° with respect to the central axis of the second penetrating space S2, and thermal stresses applied to the second fixing unit 300 may be uniformly distributed and absorbed by the three interposers 330 and the three flexible portions 352 of the second fixing unit 300.

The fixing guide 400 may be further provided with the fixing module 500. The fixing guide 400 may be secured to the chamber of the optical apparatus and the coupling unit 100 may be coupled to the fixing guide 400.

The installation site of the optical apparatus may include additional securing members corresponding to the coupling unit 100, and the fixing guide 400 may not necessarily be required to the fixing module 500. Additional securing members may not be provided with the optical apparatus, and the fixing guide 400 may be firstly secured to the optical apparatus and then the coupling unit 100 may be coupled to the fixing guide 400.

For example, the fixing guide 400 may include a guide plate 410 corresponding to the plate 110 and a vertical guide 420 protruded from the guide plate 410. The vertical guide 420 may be fixed to the installation site of the optical apparatus and the coupling unit 100 may be coupled to the guide plate 410. In an embodiment, the vertical guide 420 may be in a shape of a cylinder and may be inserted into a penetration hole of the installation site. The optical system may penetrate through the penetration hole at the installation site of the optical apparatus.

According to an embodiment of the fixing module for fixing the optical system to the optical apparatus, the first and the second fixing units 200 and 300 may be fixed to the optical system, and the assembly of the optical system and the fixing joint may be provided prior to the aligning mode of the optical system. Then, the aligning mode may be performed on the optical system fixed to the fixing joint, and the optimal position may be determined. In the aligning mode, the thermosetting resin 210 may be kept in a liquid state or a sol structure, and the protruding portion 120 may not be impeded by the thermosetting resin 210. The optimal position may be determined in the aligning mode, and the aligning of the optical system may be stopped and the optical system may be kept in the optimal position. The optical system may be temporarily fixed to a first point of the optimal position by an aligning driver. Then, the thermosetting resin may be hardened with the hardening time elapse, and the protruding portion 120 may be fixed into the thermosetting resin 210. The coupling unit 100 including the protruding portion 120 may be secured to the chamber of the optical apparatus, and the optical system may also be secured to the optical apparatus at a second point by the second fixing unit 300. The optical system may be secured to the optical apparatus at two points by the aligning driver and the second fixing unit 300.

The optical system may be secured to the optical apparatus not by external fastening forces but by the hardening of the thermosetting resin 210, and the optical system may be kept at the optimal position. The optical system may be sufficiently prevented from deviating from the optimal position in the fixing mode, in which the optical system may be fixed at a second point as well as at a first point corresponding to the optimal position by the second fixing unit 300. Misalignment of the optical system may be sufficiently prevented in the fixing mode. The interposer 330 and the flexible portion 352 may be provided with the second fixing unit 300, thermal expansion of the fixing module may be absorbed by the interposer 330 and the flexible portion 352, and the optical system may be protected from thermal expansion of the fixing module.

Optical Apparatus Having the Fixing Module

Figure 5:
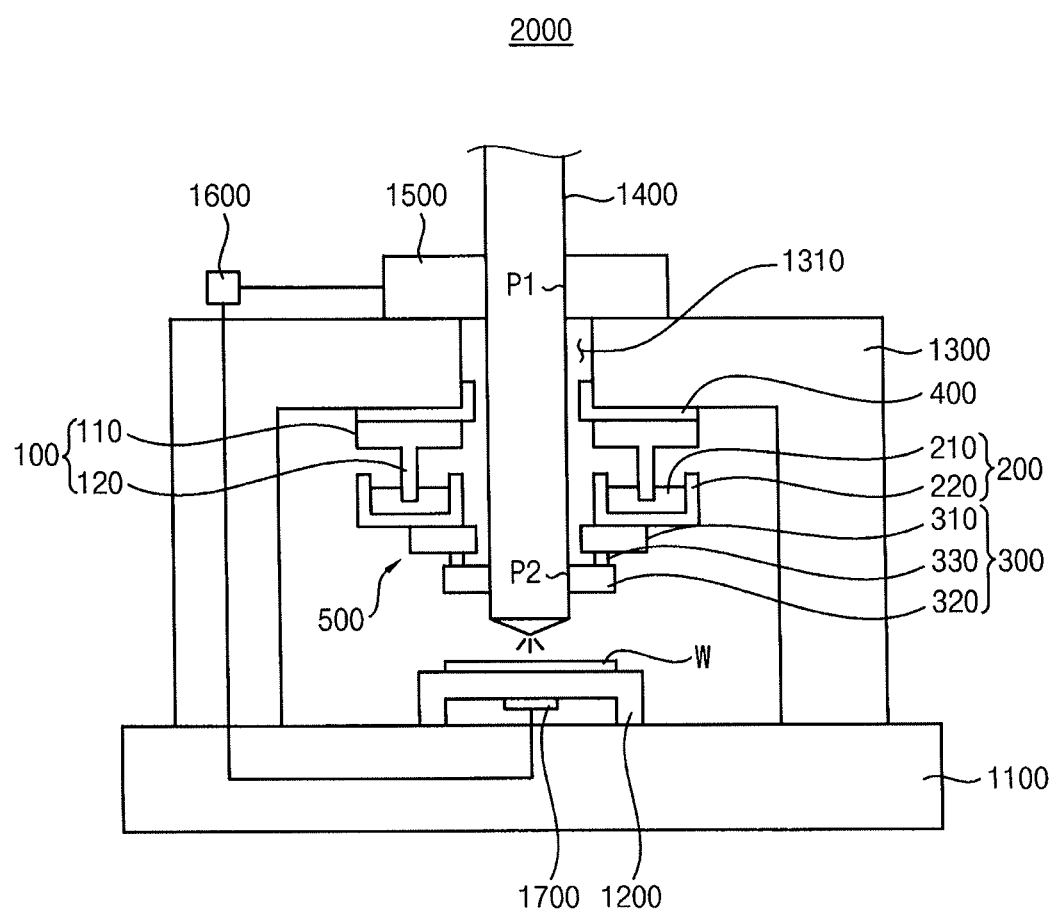
FIG. 5 illustrates a cross-sectional view of an optical apparatus including the fixing module shown in FIG. 1 in accordance with an embodiment.

FIG. 5 illustrates a cross-sectional view of an exemplary optical apparatus including the fixing module shown in FIG.

1 in accordance with an embodiment. In FIG. 5, for example, an exposure apparatus for manufacturing semiconductor devices may be disclosed as the optical apparatus. In an embodiment, the fixing module may be applied to various optical apparatus requiring installation, e.g., fixing, of the optical system.

Referring to FIG. 5, the optical apparatus 2000 in accordance with an embodiment may include a base 1100 on which a support 1200 for supporting a substrate W is arranged, a chamber 1300 arranged on the base 1100 that may define an inner space in which the support W is covered and may have a chamber opening 1310 through which the inner space may communicate with surroundings, an optical system 1400 arranged over the substrate W and penetrating through the chamber 1300, an aligning driver 1500 driving the optical system 1400 in an aligning mode to determine an optimal position for optimizing optical characteristics of the optical system 1400, and a fixing module 500 fixing the optical system 1400 to the chamber 1300 simultaneously at a first point P1 of the optimal position and a second point P2 of the optical system 1400.

The fixing module 500 may have substantially the same structures and configurations of the fixing module described in detail with reference to FIG. 1, and the same reference numerals in FIG. 5 denote the same elements in FIG. 1.

The coupling unit 100 may have a plate 110 coupled to the chamber 1300 at the chamber opening 1310 and having a first penetrating space S1 at a central portion thereof and a protruding portion 120 protruded downwards from the plate 110.

The protruding portion 120 may be fixed into the thermosetting resin 210 of the first fixing unit 200 and the first fixing unit 200 may be combinable with the second fixing unit 300. The second fixing unit 300 may include the second penetrating space S2 at a central portion thereof and the optical system 1400 may be penetrate through the first and the second penetrating spaces S1 and S2. The optical system may make contact with the second fixing unit 300 and may be fixed to the second fixing unit 300 by the fasteners 340 and 350.

In an embodiment, the optical system 1400 may be fixed to the chamber 1300 at the first point P1 corresponding to the optimal position and the second point P2, and the optical system 1400 may be prevented from being deformed or misaligned by the operation vibration of the optical apparatus 2000.

The aligning driver 1500 may be arranged on an outer side of the chamber 1300 around the chamber opening 1310 and the fixing module 500 may be arranged in the inner space of the chamber 1300, the optical system 1400 may penetrate through the aligning driver 1400, and the chamber opening 1310 and the fixing module 500 and may be fixed to the chamber 1300 by the first and the second units 200 and 300 and the coupling unit 100. The optical system 1400 may be fixed to the chamber 1300 at the first point P1 by the aligning driver 1500.

The aligning driver 1500 may drive the optical system 1400 to align or slightly move repeatedly in an aligning mode to determine an optimal position for optimizing optical characteristics of the optical system 1400 in the optical apparatus 2000.

The optical system 1400 may include a plurality of lenses and a lens driving unit, and the focal distance may be adjusted in view of the substrate W and the process in the inner space of the chamber 1300. The optimal position of the optical system 1400 denotes a relative position of the optical distance at which the focal distance of the optical system 1400 may be optimized with respect to the substrate W. The optimal position of the optical system 1400 may be determined in a 3-dimensional installation coordinates by repeating the aligning mode operation to the optical system 1400.

Prior to performing the aligning mode operation, the first and the second fixing units 200 and 300 may be fixed to the optical system at the second point P2. Then, the assembly of the optical system 1400 and the first and the second fixing units 200 and 300 (fixing joint) may be arranged in the optical apparatus 200, and the protruding portion 120 may be partially dipped into the thermosetting resin 210 of the first fixing unit 200. Then, the assembly of the optical system 1400 and fixing joint may be supported and temporarily fixed by the aligning driver 1500, and the aligning mode operation by the aligning driver 1500 may be performed.

The thermosetting resin 210 may be kept in a liquid state or a sol structure in the aligning mode, the first fixing unit 200 may not be combined with the coupling unit 100, the optical system 1400 may move in the aligning mode without any limitations to the degree of kinematic freedom, and the optimal position of the optical system 1400 at the first point P1 in the optical apparatus 2000 may be determined.

The optimal position may be determined and the aligning mode may be completed, and the optical system 1400 may be stopped and may be kept in staying at the optimal position. Then, the thermosetting resin 210 may be hardened with the hardening time elapse, and the protruding portion 120 may be fixed into the thermosetting resin 210. The coupling unit 100 including the protruding portion 120 may be secured to the chamber 1300 of the optical apparatus 2000, and the optical system 1400 may be secured to the chamber 1300 at the second point P2 by the second fixing unit 300. At the same time, the optical system 1400 may be secured to the chamber 1300 at the first point P1 of the optimal position by the aligning driver 1500. The optical system 1400 may be secured to the optical apparatus 2000 at two points by the aligning driver 1500 and the second fixing unit 300. The optical system 1400 may be secured to the chamber 1300 by resin hardening, and the optical system 1400 may be sufficiently prevented from deviating from the optimal position in the fixing mode.

The aligning driver 1500 may control the optical system 1400 in a 3-dimensional space. The optical system 1400 may be horizontally and vertically moved, rotated and tilted with respect to an axis of the optical system 1400 by the aligning driver 1500.

In an embodiment, a detecting module 1700 may be arranged under support 1200, and the optical characteristics of the optical system 1400 with respect to the substrate W may be detected by the detecting module 1700. The detecting module 1700 may be connected to a controller 1600 and the controller 1600 may control the operation of the aligning driver 1500.

In performing the aligning mode, the optical characteristics of the optical system 1400 may be detected by the detecting module 1700 and may be inspected whether or not the detected optical characteristics may be allowable. The detected optical characteristics may be included within the allowable range, and the controller 1600 may stop the aligning driver 1500 and the coordinate location of the optical system 1400 in a 3-dimensional coordinate system may be select as the optimal position of the optical system 1400. The detected optical characteristics may deviate from the allowable range, and the aligning driver 1700 may be controlled to perform the aligning mode repeatedly until the detected optical characteristics may be included within the allowable range.

For example, the aligning mode may be performed on the assembly of the optical system 1400 and the fixing joint, and the aligning mode may be easily repeated should the detected optical characteristics deviate from the allowable range.

The aligning mode may be performed on a single optical system without the fixing unit. The fixing unit may be fixed to the optical system after completing the aligning mode, and it may be necessary to repeat the aligning mode, which may require the separation of the fixing unit from the optical system. Repetition of the aligning mode may be quite difficult, and the separation and combination of the optical system and the fixing unit may be manually performed by an operator, which may significantly reduce the installation efficiency of the optical system.

According to an optical apparatus including the fixing module 500 shown in FIG. 1, the aligning mode may be performed on the assembly of the optical system 1400 and the fixing joint, and repetition of the aligning mode may not require separation of the fixing joint from the optical system 1400. The aligning mode may be automatically performed in the optical apparatus 2000. For example, the aligning driver 1500 may be controlled based on the detected optical characteristics of the optical system 1400, and the aligning mode may be automatically repeated until the detected optical characteristics of the optical system 1400 may be included within the allowable ranges.

According to an embodiment of the optical apparatus, the aligning mode for searching and determining the optimal position of the optical system may be performed after the fixing unit may be fixed to the optical system, the assembly of the optical system and the fixing joint may be fixed to the chamber of the optical apparatus by hardening the thermosetting resin without external fastening forces and manual operations, and the optical system may be prevented from deviating from the optimal position in the fixing mode. For example, the aligning mode of the optical system may be automatically repeated until the detected optical characteristics may be included within the allowable ranges, and the installation accuracy and efficiency of the optical system to the optical apparatus may be increased.

In an embodiment, although relative deformations such as thermal expansions of the fixing module 500 may occur in operating the optical apparatus 2000, the interposer 330 and the flexible portion 352 may sufficiently absorb deformations of the fixing module, and the optical system 1400 may be protected from the external deformations and stresses and may prevent deterioration of the optical characteristics of the optical system 1400.

Installation Method of the Optical System Using the Fixing Module

Figure 6:
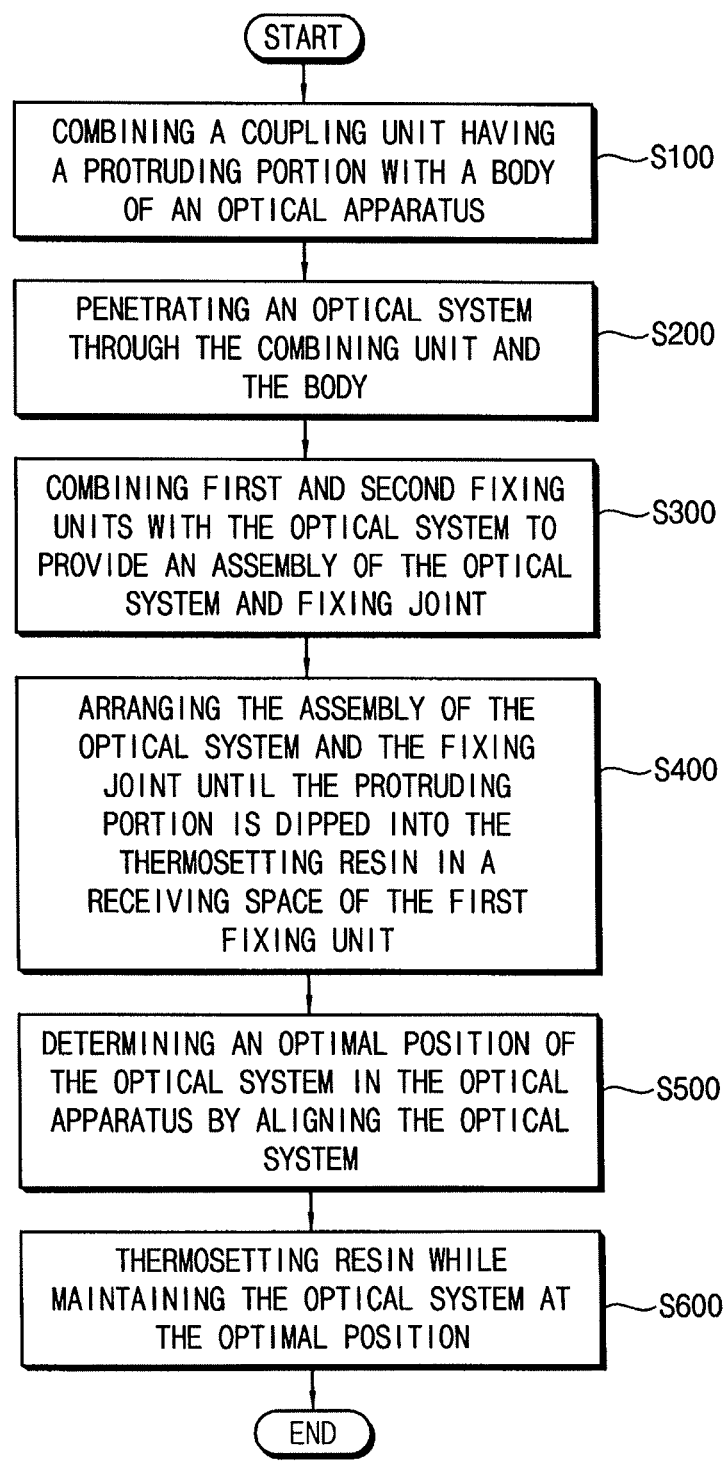
FIG. 6 illustrates a flow chart showing processing steps for a method of fixing an optical system to an optical apparatus shown in FIG. 5 using the fixing module shown in FIG. 1.

FIG. 6 illustrates a flow chart showing processing steps for a method of fixing an optical system to an optical apparatus shown in FIG. 5 using the fixing module shown in FIG. 1.

Referring to FIGS. 1, 5 and 6, the coupling unit 100 including the protruding portion 120 may be combinable with the chamber 1300 of the optical apparatus 2000 (step S100).

The chamber 1300 may include the chamber opening 1310 through which the optical system 1400 may penetrate and the aligning driver 1500 may be installed onto on an outer surface of the chamber 1300, and the chamber opening 1310 may be covered with the aligning driver 1500. The coupling unit 100 may be located on an inner surface of the chamber 1300 around the chamber opening 1310. The coupling unit 100 may include the ring-shaped plate 110 and the protruding portion 120 protruded from the plate 110 downwards.

The chamber opening 1310 may include joint members corresponding to the plate 110, and the plate 110 may be directly combinable with the chamber opening 1310. The chamber opening 1310 may include no joint members corresponding to the plate 110, and the fixing guide 400 may be firstly secured to the chamber opening 1310 and then the plate 110 may combined with the fixing guide 400. For example, the coupling unit 100 may be combined with the chamber 1300 around the chamber opening 1310 at an inside of the chamber 1300.

Then, the optical system 1400 may be arranged in the optical apparatus 2000, and the optical system 1400 may penetrate through the chamber opening 1310 of the chamber 1300 and the coupling unit 100 (step S200).

The optical system 1400 may penetrate through the aligning driver 1500 at an outside of the chamber 1300 and may be inserted into the inner space of the chamber 1300. The optical system 1400 may be supported and movably gripped by the aligning member 1500.

Then, the first and the second fixing units 200 and 300 may be combined with the optical system 1300, and the assembly of the optical system and the fixing joint (step S300) may be provided.

Figure 7:
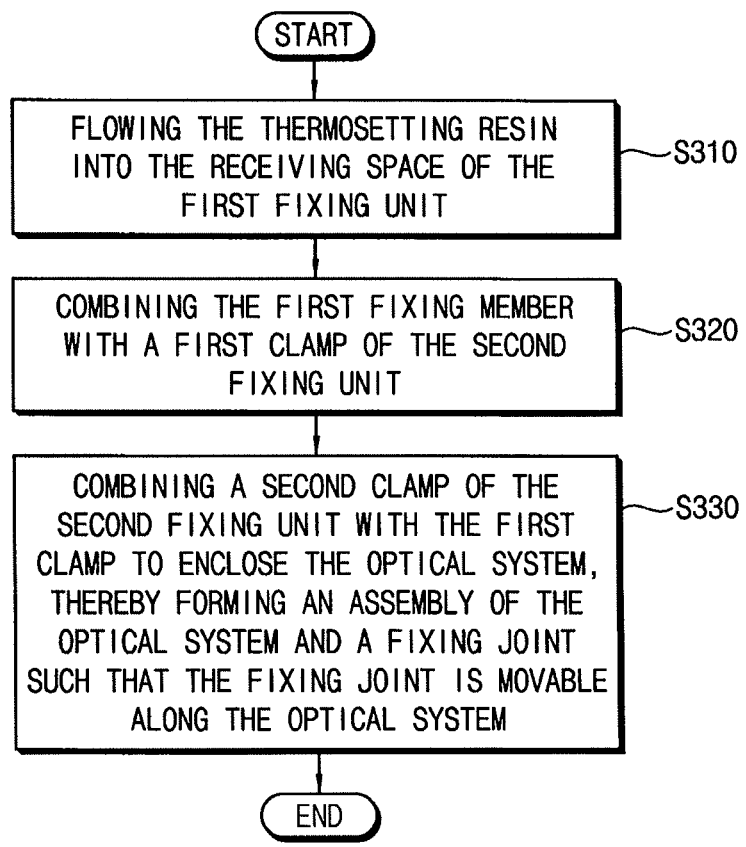
FIG. 7 illustrates a flow chart showing the step of combining the first and the second fixing units with the optical system in FIG. 6.

FIG. 7 illustrates a flow chart showing the step of combining the first and the second fixing units with the optical system in FIG. 6.

Referring to FIG. 7, the thermosetting resin 210 may be flowed into the receiving space RS of the first fixing member 200 (step S310). For example, a liquefied resin or a sol-structured resin having a large fluidity and a small viscosity may be sufficiently supplied into the receiving space RS. For example, a plurality of hardening agents may be filled into the thermosetting resin 210 and the hardening velocity of the resin 210 may be controlled, and the thermosetting resin 210 may not be hardened until the aligning mode of the optical system 1300 may be completed. The hardening time of the thermosetting resin 210 may be controlled to be greater than the aligning time of the optical system 1400.

Then, the first clamp 310 of the second fixing unit 300 may be combined with the first fixing unit 200 (step S320). For example, a lower surface of the first fixing unit 200 may be adhered or coupled to an upper surface of the first clamp 310. Otherwise, the first fixing unit 200 and the first clamp 310 may be integrally provided together with each other in one body.

Thereafter, the second clamp 320 may be combined with the first clamp 310 coupled to the first fixing unit 200, and the optical system 1400 may be enclosed by the second clamp 320 and may be movably combined with the assembly of the first and the second fixing units 200 and 300 (fixing joint) (step S330).

In an embodiment, the first and the second fixing units 200 and 300 may be separated into the first and the second pieces, and the fixing joint may also be separated into joint pieces. A pair of the joint pieces may be arranged around the optical system 1400 and may be combinable with each other by the fasteners 340 and 350, and the assembly of the optical system 1400 and the fixing joint may be formed. For example, the compressive force of the fixing joint to the optical system 1400 may be variably controlled by using the variable fastener 350 such as the pressure controller, and the fixing joint may be movably combined with the optical system 1400.

In an embodiment, the first clamp 310 may be modified to include the slot 351 and the flexible portion 352 before combing with the first fixing unit 200. Then, the interposer 330 may be further arranged between the first and the second clamps 310 and 320 before combining the second clamp 320 with the first clamp 310. The relative deformation of the fixing module 500 such as thermal expansions may be absorbed into the flexible portion 352 via the interposer 330, and the optical system 1400 may be protected from the external stresses, for example, due to the relative deformation. The interposer 330 may be firstly combined with the first clamp 310 and then the second clamp 320 may be combined with the interposer 330.

The first clamp 310 and the interposer 330 may be integrally formed together with each other in one body. In an embodiment, the first clamp 310, the interposer 330 and the second clamp 320 may also be integrally formed together with one another in one body. A bulk type fixing unit including the first clamp 310, the interposer 330 and the second clamp 320 in one body may be separated into a pair of bulk pieces, and then the bulk pieces may be arranged around the optical system 1400 and the optical system 1400 may be enclosed by a pair of the bulk pieces. Then, the bulk pieces may be combined with each other by the fasteners 340 and 350.

Referring to again FIG. 6, the assembly of the optical system and the fixing joint may be arranged in the chamber 1300 of the optical apparatus 2000, and the protruding portion 120 may be partially dipped into the thermosetting resin 210 of the first fixing unit 200 (step S400).

The fixing joint may be movably combined with the optical system 1400, and the fixing joint may move along the axis the optical system 1400 until the protruding portion 120 of the coupling unit 100 may be partially dipped into the liquefied resin 210 in the receiving space RS.

For example, the protruding portion 120 may be controlled to be spaced apart from the bottom of the trench 222 of the body 220, and the body 220 may be protected from deformation of the protruding portion 120 in the hardening process of the resin 210 and in the process operation of the optical apparatus 2000.

The protruding portion 120 may be sufficiently dipped into the thermosetting resin 210, and the fixing joint may be secured to the optical system 1400. For example, the pressure controller may apply a sufficient pressure to the optical system 1400, and the second clamp 320 may be firmly secured to the optical system 1400.

The optical system 1400 may be supported by the aligning driver 1500 around the chamber opening 1310 and the thermosetting resin 210 may be kept in a liquid state, and the optical system 1400 may be temporarily combined with the chamber by the aligning driver 1500 just merely at 1-point at an upper portion of the chamber 1300.

Then, the aligning driver 1500 may drive the optical system 1400 to be aligned with respect to the substrate W under the optical system 1400, and the optimal position of the optical system 1400 may be determined in the optical apparatus 2000 (Step S500).

The aligning driver 1500 may control the optical system 1400 in the first and the second penetrating spaces S1 and S2. The optical system 1400 may be horizontally and vertically moved, rotated and tilted with respect to an axis of the optical system 1400 by the aligning driver 1500.

The aligning driver 1500 may be operated according to an operation algorithm of the controller 1600, and the coordinate location of the optical system 1400 in a 3-dimensional coordinate system may be stored as the temporary position of the optical system 1400 by the controller 1600. Then, the optical characteristics of the optical system 1400 with respect to the substrate W may be detected by the detecting module 1700 at the temporary position of the optical system 1400. The optical characteristics of the optical system 1400 may be detected and may be inspected whether or not the detected optical characteristics may be allowable.

The detected optical characteristics may be included within the allowable range, and the controller 1600 may stop the aligning driver 1500 and may select the temporary position as the optimal position of the optical system 1400. The detected optical characteristics may deviate from the allowable range, and the aligning driver 1700 may be controlled to repeat the aligning mode until the detected optical characteristics may be included within the allowable range.

The thermosetting resin 210 may be kept in a liquid state, and the first fixing unit 200 may move in a range of the inner and outer gap distances d1 and d2 together with the optical system 1400 when performing the aligning mode.

The optimal position may be determined by the controller 1600, and the assembly of the optical system 1400 and the fixing joint may be kept at the optimal position and the thermosetting resin 210 in the receiving space RS may be hardened. The coupling unit 100 and the first fixing unit 200 may be combined with each other, and the assembly of the optical system 1400 and the fixing joint may be firmly fixed to the chamber 1300 of the optical apparatus 2000 (step S600).

When selecting the optimal position of the optical system 1400, the controller 1600 may control the aligning driver 1500 to stop, the assembly of the optical system 1400 and the fixing joint may be kept at the optimal position, and the protruding portion 120 of the coupling unit 100 may be dipped into the resin 210 of the first fixing unit 200.

The thermosetting resin 210 may be hardened as the hardening time may elapse, and the protruding portion 120 may be gradually fixed into the solidified thermosetting resin 210 without any deviation of the optical system 1400 from the optimal position. The first fixing unit 200 may be coupled to the coupling unit 100, which may be secured to the chamber 1300 of the optical apparatus 2000, the optical system 1400 may be kept at the optimal position, and the assembly of the optical system 1400 and the fixing joint may be accurately fixed to the chamber 1300 at the optimal position without any deviation of the optical system 1400 from the optimal position. The optical system 1400 may be fixed to the fixing joint at the second point P2 and simultaneously fixed to the chamber 1300 at the first point P1 by the aligning driver 1500.

According to the above embodiments, the aligning mode for searching and determining the optimal position of the optical system 1400 may be performed after the first and the second fixing units 200 and 300 may be combined with the optical system 1400, and the assembly of the optical system and the fixing joint may be stably secured to the chamber 1300 of the optical apparatus 2000 by hardening the thermosetting resin 210 without external fastening forces and manual operations. The optical system 1400 may be prevented from deviating from the optimal position in the fixing mode. For example, the aligning mode of the optical system 1400 may be automatically repeated until the detected optical characteristics may be included within the allowable ranges, and the installation accuracy and efficiency of the optical system 1400 to the optical apparatus 2000 may be increased.

In an embodiment, although relative deformations such as thermal expansions of the fixing module 500 may occur in operating the optical apparatus 2000, the interposer 330 and the flexible portion 352 may sufficiently absorb deformations of the fixing module, and the optical system 1400 may be protected from the external deformations and stresses and may prevent deterioration of the optical characteristics of the optical system 1400.

Provided are various optical apparatuses as well as semiconductor optical process apparatus such as an exposure apparatus and an inspection apparatus. For example, the fixing module may be utilized for fixing a laser illuminator to a laser welding apparatus and for fixing a lens system to a camera and illuminator.

By way of summation and review, an optimal position of the optical system for optimizing the optical characteristics of the optical apparatus may be searched by repeatedly performing the aligning mode when the optical system is initially fixed to the optical apparatus. For example, an aligning driver may repeatedly move the optical system in a vertical or a horizontal direction together with rotating and tilting the optical system, and the optimal position in three dimensional installation coordinates may be determined. Once the aligning mode is completed, the optical system may be temporarily fixed to the optical apparatus at the optimal position by the aligning driver. Then, the optical system may be firmly fixed to the optical apparatus at the optimal position through the additional fixing mode, and the optical system may be prevented from deviating from the optimal position in the optical apparatus.

The optical system may be fixed to the optical apparatus only at one point of the optimal position, and the optical system may be vulnerable to operational vibrations of the optical apparatus, which may cause severe deterioration of the optical characteristics of the optical system in the optical apparatus. For those reasons, a 2-point fixing type optical system may be used in a field of semiconductor industries requiring ultimately high accuracy.

According to the 2-point fixing type optical system, the optical system may be temporarily fixed to the optical apparatus at a first point of the optimal position after completing the aligning mode, and then may be firmly fixed to the optical apparatus at a second point in an additional fixing mode. For example, the cylindrical optical system of an exposure apparatus for semiconductor devices may be fixed to a chamber of the exposure apparatus at upper and lower points of the cylindrical optical system.

Although the optimal position may be determined with sufficient accuracy in the aligning mode, the optical system may deviate from the optimal position in the fixing mode, for example, due to external disturbances, such as fastening forces of bolts. Misalignment of the optical system may occur in the fixing mode no matter how accurately the aligning mode is performed. Once misalignment of the optical system occurs, the installation, e.g., fixing, process of the optical system needs to start again from the aligning mode. The aligning mode may be repeated again on the optical system to determine the optimal position of the optical system, and then the fixing mode may be performed on the optical system, while deviation of the optical system from the optimal position may be restrained as much as possible. The fixing of the optical system to the optical apparatus may require a repetition of the aligning mode and the fixing mode, and the time and cost of the installation of the optical system may be increased.

For example, fixation of the optical system to the optical apparatus may be performed not in the aligning mode but in the fixing mode, fixation of the optical system at the optimal position may be manually performed by an operator in the fixing mode, and the optimal fixation of the optical system to the optical apparatus may be difficult to automate.

Fastening members such as bolts may cause thermal stresses to the optical system, for example, due to the thermal coefficient difference between the optical system and the chamber of the optical apparatus. The optical apparatus may be operated under high temperature, and the optical characteristics of the optical system may deteriorate, for example, due to the thermal stresses.

Embodiments provide an improved fixing module for fixing an optical system to an optical apparatus in which the optical system may be automatically fixed to the optical apparatus and the optical system may be sufficiently protected from thermal stresses.

Embodiments provide a fixing module for a 2-point fixing type optical system in which the optical system may be fixed to an optical apparatus at an optimal position by using a thermosetting resin, and an optical apparatus having the above fixing unit.

According to an embodiment, a fixing joint including first and the second fixing units 200 and 300 may be fixed to the optical system, and an assembly of the optical system and the fixing joint may be provided prior to an aligning mode of the optical system. Then, the aligning mode may be performed on the optical system fixed to the fixing joint, and the optimal position may be determined. In the aligning mode, the thermosetting resin 210 may be kept in a liquid state or a sol structure, and the protruding portion 120 may not be impeded by the thermosetting resin 210. The optimal position may be determined in the aligning mode, the aligning of the optical system may be stopped, and the optical system may be kept at the optimal position. The optical system may be temporarily fixed to a first point of the optimal position by an aligning driver. Then, the thermosetting resin may be hardened with the hardening time elapse, and the protruding portion 120 may be fixed into the thermosetting resin 210. The coupling unit 100 including the protruding portion 120 may be secured to the chamber of the optical apparatus, and the optical system may also be secured to the optical apparatus at a second point by the second fixing unit 300. The optical system may be secured to the optical apparatus at two points by the aligning driver and the second fixing unit 300.

The optical system may be secured to the optical apparatus not by external fastening forces but by the hardening of the thermosetting resin 210, and the optical system may be kept at the optimal position. The optical system may be sufficiently prevented from deviating from the optimal position in the fixing mode, in which the optical system may be fixed at a second point as well as at a first point corresponding to the optimal position by the second fixing unit 300. Misalignment of the optical system may be sufficiently prevented in the fixing mode. An interposer 330 and flexible portion 352 may be provided with the second fixing unit 300, thermal expansion of the fixing module may be absorbed by the interposer 330 and the flexible portion 352, and the optical system may be protected from thermal expansion of the fixing module.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A fixing module for fixing an optical system to an apparatus, comprising:
   a coupling unit having a plate to couple to the apparatus, the coupling unit having a first penetrating space at a central portion thereof and a protruding portion protruded downwards from the plate;
   a first fixing unit combinable with the coupling unit and having a receiving space including a thermosetting resin such that the protruding portion is fixed into the thermosetting resin; and
   a second fixing unit combinable with the first fixing unit and having a second penetrating space communicating with the first penetrating space, such that the optical system penetrates the coupling unit and the second fixing unit through the first and second penetrating spaces thereof and is fixed by the second fixing unit.

2. The fixing module as claimed in claim 1, wherein the thermosetting resin includes a room temperature thermosetting resin which hardens at room temperature and a plurality of hardening agents for controlling a hardening velocity of the room temperature thermosetting resin such that a hardening time of the room temperature thermosetting resin is greater than an aligning time during which the optical system is aligned together with and the first and second fixing units, so that the protruding portion moves in the thermosetting resin in the aligning time.

3. The fixing module as claimed in claim 2, wherein the thermosetting resin includes one or more of a phenol resin, a urea resin, a melamine resin, an epoxy resin, a polyimide resin, or a polyester resin.

4. The fixing module as claimed in claim 1, wherein the first fixing unit includes a body in a shape of the plate and having a trench at an upper portion thereof, so that the receiving space is provided in the trench at the upper portion of the body and the protruding portion is inserted into the thermosetting resin in the receiving space of the body.

5. The fixing module as claimed in claim 4, wherein a top surface of the thermosetting resin is lower than an upper surface of the first fixing unit and the protruding portion is spaced apart from a bottom of the trench.

6. The fixing module as claimed in claim 1, wherein the second fixing unit includes:
   a first clamp combinable with the first fixing unit and having a first penetration opening at a central portion thereof such that at least a slot is provided through the first clamp and at least a flexible portion having a reduced thickness is provided under the slot;
   a second clamp under the first clamp and having a second penetration opening communicating with the first penetration opening to thereby provide a second penetrating space, the second clamp to make contact with the optical system penetrating through the first and second penetrating spaces; and
   at least one interposer between the first and second clamps, the at least one interposer transferring a relative deformation of the fixing module to the flexible portion of the first clamp, to protect the optical system from stress caused by the relative deformation.

7. The fixing module as claimed in claim 6, wherein the first and second clamps are each separated into first and second pieces, and the second fixing unit further includes:
   a constant fastener combining the first and second pieces with each other by a constant pressure; and
   a variable fastener combining the first and second pieces with each other by a variable pressure, so that a compressive force of the second clamp to the optical system is variable.

8. The fixing module as claimed in claim 7, wherein:
   the first fixing unit is separated into first and second pieces,
   the first piece of the first clamp is integrally provided with the first piece of the first fixing unit in one body,
   the second piece of the first clamp is integrally provided with the second piece of the first fixing unit in one body,
   the coupling unit is separated into first and second pieces,
   the first piece of the coupling unit corresponds to the first piece of the first fixing unit, and
   the second piece of the coupling unit corresponds to the second piece of the first fixing unit.

9. The fixing module as claimed in claim 6, wherein the at least one interposer includes a slender member extending in a radial direction of a width of the first clamp under a central portion of the slot.

10. The fixing module as claimed in claim 6, wherein three interposers are uniformly arranged along a peripheral area of the first clamp at a central angle of 120° with respect to a central axis of the second penetrating space.

11. The fixing module as claimed in claim 1, further comprising a fixing guide to secure to the apparatus and combinable with the coupling unit, so that the coupling unit can be secured to the apparatus via the fixing guide.

12. An optical apparatus, comprising:
   a support on a base;
   a chamber on the base and defining an inner space in which the support is covered, the chamber having a chamber opening through which the inner space communicates with surroundings;
   an optical system over the support and penetrating through the chamber;
   an aligning driver driving the optical system; and
   a fixing module fixing the optical system at first and second points, the fixing module including:
      a coupling unit having a plate coupled to the chamber at the chamber opening and having a first penetrating space at a central portion thereof and a protruding portion protruded downwards from the plate, a first fixing unit combinable with the coupling unit and having a receiving space including a thermosetting resin such that the protruding portion is fixed into the thermosetting resin, and a second fixing unit combinable with the first fixing unit and having a second penetrating space communicating with the first penetrating space, the optical system penetrating through the first and second penetrating spaces and being fixed by the second fixing unit.

13. The optical apparatus as claimed in claim 12, wherein the aligning driver is arranged on an outer side of the chamber around the chamber opening and the fixing module is arranged in the inner space of the chamber such that the optical system penetrates through the aligning driver, the chamber opening, and the fixing module, and is fixed to the chamber by the first and second fixing units and the coupling unit.

14. The optical apparatus as claimed in claim 12, further comprising:

a detecting module under the support and detecting optical characteristics of the optical system; and
a controller connected to the detecting module.

15. An optical apparatus including a chamber, comprising:
   an optical system; and
   a fixing module including thermosetting resin,
   the optical system being fixed to the optical apparatus at a first point and fixed to the fixing module at a second point, wherein:
   the fixing module includes a coupling unit having a plate coupled to an opening of the chamber and having a first penetrating space at a central portion thereof and a protruding portion protruded downwards from the plate, a first fixing unit combinable with the coupling unit and having a receiving space including a thermosetting resin such that the protruding portion is fixed into the thermosetting resin, and a second fixing unit combinable with the first fixing unit and having a second penetrating space communicating with the first penetrating space, the optical system penetrating through the first and second penetrating spaces; and
   the optical system is fixed to the second fixing unit at the second point.

16. The optical apparatus as claimed in claim 15, wherein the optical system is fixed to the fixing module at the second point by compressive force.

17. The optical apparatus as claimed in claim 16, wherein the thermosetting resin includes a resin selected from the group consisting of a phenol resin, a urea resin, a melamine resin, an epoxy resin, a polyimide resin, and a polyester resin.

18. The optical apparatus as claimed in claim 17, wherein the thermosetting resin hardens at room temperature and includes a plurality of hardening agents.

* * * * *